United States Patent [19]

Sites

[11] Patent Number: 5,450,575
[45] Date of Patent: Sep. 12, 1995

[54] USE OF STACK DEPTH TO IDENTIFY MACHINE CODE MISTAKES

[75] Inventor: Richard L. Sites, Boylston, Mass.

[73] Assignee: Digital Equipment Corporation, Maynard, Mass.

[21] Appl. No.: 666,210

[22] Filed: Mar. 7, 1991

[51] Int. Cl.6 .......................... G06F 11/00; G06F 9/45
[52] U.S. Cl. ............... 395/700; 364/DIG. 1; 364/267.91; 364/280.4; 395/775; 395/183.14
[58] Field of Search .................. 371/19; 364/DIG. 1; 395/575, 700

[56] References Cited

U.S. PATENT DOCUMENTS

| | | | |
|---|---|---|---|
| 5,127,103 | 6/1992 | Hill et al. | 395/575 |
| 5,132,972 | 7/1992 | Hansen | 371/19 |

FOREIGN PATENT DOCUMENTS

| | | |
|---|---|---|
| 0372835 | 6/1990 | European Pat. Off. |
| WO90/1738 | 2/1990 | WIPO |

OTHER PUBLICATIONS

Schneider, Y., "Converting a Portable Pascal P-Code Interpreter to a Code Generator", *Software Practice and Experience*, 1989, pp. 1111–1113.

Banning, "The XDOS Binary Code Conversion System", COMPCON 89, 27 Feb. 1989, San Francisco, pp. 282–287.

Hunter et al., DOS at RISE, Byte Magazine, vol. 14, No. 12, Nov. 1989, pp. 361–368.

*Primary Examiner*—Stephen M. Baker
*Attorney, Agent, or Firm*—Gary E. Ross; Arthur W. Fisher

[57] ABSTRACT

A code translator, constructed similar to a compiler, accepts as an input to be translated the assembly code written for one architecture (e.g., VAX), and produces as an output object code for a different machine architecture (e.g., RISC). The input code is converted into an intermediate language, and a flow graph is constructed. The flow graph is referenced by a flow analyzer for recognizing certain architecture-specific and calling standard-specific coding practices or idioms that can produce mistakes if not revised before converting, particularly relating to stack usage. By tracking stack usage within and across routines, the compiler can distinguish up-level stack and return address references from valid local references. Also, it can inform the user of stack misalignment, which has a severe performance penalty, and can detect code segments where different flow paths may result in different stack depths at run-time, which may indicate a source code error.

24 Claims, 8 Drawing Sheets

ORIGINAL ASSEMBLY CODE:   ADDL 3   #1,J,I

RISC CODE:   LOAD    RN, J
             ADDI    RN, #1
             STORE   RN, I

INTERMEDIATE LANGUAGE:

USE OF STACK DEPTH TO IDENTIFY MACHINE CODE MISTAKES

RELATED CASES

The application discloses subject matter also disclosed in the following U.S. patent applications filed herewith and incorporated herein by reference, these applications being assigned to Digital Equipment Corporation, the assignee of the present invention:

Ser. No. 666,083, filed Mar. 7, 1991, now U.S. Pat. No. 5,301,325 by Thomas R. Benson, for "USE OF STACK DEPTH TO IDENTIFY ARCHITECTURE AND CALLING STANDARD DEPENDENCIES IN MACHINE CODE".

BACKGROUND OF THE INVENTION

This invention relates to programs for digital computers, and more particularly to code translation for conversion of instruction code which was written for one computer architecture to code for a more advanced architecture.

Computer architecture is the definition of the basic structure of a computer from the standpoint of what exactly can be performed by code written for this computer. Ordinarily, architecture is defined by such facts as the number of registers in the CPU, their size and content, the logic operations performed by the ALU, shifter, and the like, the addressing modes available, data types supported, memory management functions, etc. Usually, the architectural definition is expressed as an instruction set, and related elaboration.

As the technology used in constructing computers evolves, so does computer architecture. Semiconductor technology has served to make all structural features of a computer faster, less costly, smaller, lower in power dissipation, and more reliable. In view of such changes in the economics and performance of the computer hardware, it is necessary to make corresponding changes in architecture to take full advantage of existing hardware technology. For example, the CPU data paths have evolved from 16-bit, to 32-bit, to 64-bit. And, as memory has become cheaper, the addressing range has been greatly extended. A major departure in computer architecture, however, has been the retreat from adding more complex and powerful instructions, and instead architectures with reduced instruction sets have been shown to provide performance advantages.

Complex instruction set or CISC processors are characterized by having a large number of instructions in their instruction set, often including memory-to-memory instructions with complex memory accessing modes. The instructions are usually of variable length, with simple instructions being only perhaps one byte in length, but the length ranging up to dozens of bytes. The VAX TM instruction set is a primary example of CISC and employs instructions having one to two byte opcodes plus from zero to six operand specifiers, where each operand specifier is from one byte to many bytes in length. The size of the operand specifier depends upon the addressing mode, size of displacement (byte, word or longword), etc. The first byte of the operand specifier describes the addressing mode for that operand, while the opcode defines the number of operands: one, two or three. When the opcode itself is decoded, however, the total length of the instruction is not yet known to the processor because the operand specifiers have not yet been decoded. Another characteristic of processors of the VAX type is the use of byte or byte string memory references, in addition to quadword or longword references; that is, a memory reference may be of a length variable from one byte to multiple words, including unaligned byte references.

Reduced instruction set or RISC processors are characterized by a smaller number of instructions which are simple to decode, and by requiring that all arithmetic/logic operations be performed register-to-register. Another feature is that of allowing no complex memory accesses; all memory accesses are register load/store operations, and there are a small number of relatively simple addressing modes, i.e., only a few ways of specifying operand addresses. Instructions are of only one length, and memory accesses are of a standard data width, usually aligned. Instruction execution is of the direct hardwired type, as distinct from microcoding. There is a fixed instruction cycle time, and the instructions are defined to be relatively simple so that they all execute in one short cycle (on average, since pipelining will spread the actual execution over several cycles).

An objective of using more complex instructions was to have been in reducing the number of lines of code needed for a particular operation, thus simplifying the task of writing source code. The variety of powerful CISC instructions, memory accessing modes and data types should have resulted in more work being done for each line of code (actually, compilers did not produce code taking full advantage of this). However, whatever gain in compactness of source code for a CISC processor was accomplished at the expense of execution time. Particularly as pipelining of instruction execution has become necessary to achieve performance levels demanded of systems presently, the data or state dependencies of successive instructions, and the vast differences in memory access time vs. machine cycle time, produce excessive stalls and exceptions, slowing execution. The advantage of a RISC processor is the speed of execution of code, but the disadvantage is that less is accomplished by each line of code, and so the code to accomplish a given task would be expected to be much more lengthy. The initial impression is that one line of VAX code could accomplish the same as many lines of RISC code. However, as the technology of optimization has evolved, it is found that for various reasons the effect of RISC technology is to expose the microarchitecture of the CPU to the compiler (the RISC machine is not microcoded), and allow the compiler to construct optimized code that is as efficient as that CISC code was to have been. Thus, it is found that the code length is not much greater for a RISC machine as for an equivalent CISC architecture.

When CPUs were much faster than memory, it was advantageous to do more work per instruction, because otherwise the CPU would always be waiting for the memory to deliver instructions—this factor lead to more complex instructions that encapsulated what would be otherwise implemented as subroutines. When CPU and memory speed became more balanced, a simple approach such as that of the RISC concepts became more feasible, assuming the memory system is able to deliver one instruction and some data in each cycle. Hierarchical memory techniques, as well as faster access cycles, provide these faster memory speeds. Another factor that has influenced the CISC vs. RISC choice is the change in relative cost of off-chip vs. on-chip interconnection resulting from VLSI construction of CPUs. Construction on chips instead of boards changes the economics—first it pays to make the architecture simple enough to be on one chip, then more on-chip memory is possible (and needed) to avoid going off-chip for memory references. A further factor in the comparison is that adding more complex instructions and addressing modes as in a CISC solution complicates (thus slows down) stages of the instruction execution process. The complex function might make the function execute faster than an equivalent sequence of simple instructions, but it can lengthen the instruction cycle time, making all instructions execute slower; thus an added function must increase the overall performance enough to compensate for the decrease in the instruction execution rate.

The performance advantages of RISC processors, taking into account these and other factors, is considered to outweigh any shortcomings, and, were it not for the existing software base, most new processors would probably be designed using RISC features. In order for the software base, including operating systems and applications programs, to build up to a high level so that potential and existing users will have the advantages of making use of the product of the best available programming talent, a computer architecture must exhibit a substantial market share for a long period of time. If a new architecture were adopted every time the technology advances allowed it, the software base would never reach a viable level. This issue is partly alleviated by writing code in high level languages; a program written in C should be able to be compiled to run on a VAX/VMS TM operating system, or a UNIX TM operating system, or on MS/DOS, and used on various architectures supported by these operating systems. For performance reasons, however, a significant amount of code is written in assembly language, particularly operating systems, and critical parts of applications programs. Assembly language programs are architecture-dependent.

Business enterprises (computer users, as well as hardware and software producers) have invested many years of operating background, including operator training as well as the cost of the code itself, in operating systems, applications programs and data structures using the CISC-type processors which were the most widely used in the past ten or fifteen years. The expense and disruption of operations to rewrite the code and data structures by hand to accommodate a new processor architecture may not be justified, even though the performance advantages ultimately expected to be achieved would be substantial.

Code translators are thus needed to ease the task of converting code written for one computer architecture to that executable on a more advanced architecture. The purpose of a code translator is to take in, as input, computer code written for execution on one type of architecture (e.g., VAX), and/or one operating system (e.g., VMS), and to produce as an output either executable code (object code) or assembly code for the advanced architecture. This is preferably to be done, of course, with a minimum of operator involvement. A particular task of a code translator is to detect latent error-producing features of the code, i.e., features that were acceptable in the prior use of the code as it executed on the previous operating system or architecture, but which may produce errors in the new environment.

SUMMARY OF THE INVENTION

In accordance with one embodiment of the invention, a code translator is constructed in a manner similar to a compiler, and may indeed be implemented as part of a compiler. The code translator accepts as an input the code which is to be translated, in a manner similar to the front end of a compiler or assembler. This input code may be object code, assembly code or source code, however. The input code is parsed to determine its content, with the basic building blocks of the code identified (separated) and converted, if necessary, into an intermediate language. The intermediate version of the code is stored in a data structure referred to as a flow graph. The flow graph is referenced by flow analyzer techniques and optimization routines, before generating object code for the target machine. This translator is particularly adapted for translating VAX assembly language into an advanced RISC architecture.

In translating code of one of the CISC architectures into code for a RISC architecture, there appear certain architecture-specific and calling standard-specific coding practices that cannot be automatically converted. The translator must detect these idioms and report them (via display or printer) to allow the user to make manual code changes. Among these practices, an important one is stack references which rely on the operation of VAX procedure call instructions. A VAX procedure call (e.g., a CALLS instruction) uses the stack to pass arguments, and it has been a coding practice to use the VAX procedure call in ways that result in errors if translated literally. By tracking stack usage within and across routines, the translator can distinguish up-level stack and return address references from valid local references. In addition, it can inform the user of stack misalignment, which has a severe performance penalty. Finally, it can detect code segments where different flow paths may result in different stack depths at runtime, which may indicate a source code error.

Thus, in translating VAX object code to advanced RISC object code, it is useful to keep track of the relative runtime stack depth within each procedure or subroutine. Once the mechanism to track this information is available, it is possible to discover mistakes in existing programs by checking for stack-depth consistency over all paths within a routine. If two different VAX code paths can arrive at the same instruction with different relative stack depths, and the stack pointer is subsequently used, then there is quite likely a mistake in the original program. The translator having the facility for tracking stack depth finds such mistakes.

Accordingly, for each routine being translated, the translator builds a flow graph and visits each basic block in flow order, beginning at the routine entry point. The translator records the amount of which the stack pointer is changed in each block, and maintains the cumulative offset from the routine entry point. As it processes each instruction in the block, it can use this cumulative offset, along with any stack-based operand specifiers in the instruction (or stack reference implicit in the instruction), to distinguish whether the instruction:

reads the return address from the stack
    modifies the return address on the stack
    removes the return address from the stack
    issues a JSB procedure call through the return address to implement a co-routine linkage
    makes an up-level stack reference makes an unaligned stack reference
modifies SP such that it is no longer longword aligned In each of these cases, the compiler/translator detects these occurrences so that the user can be advised of the specific usage, and thus the user can make the appropriate changes to the input code. Multiple flow paths to the same basic block are also detected; these may result in different cumulative stack depths—the user can be advised of this occurrence, which is sometimes an indication of an error in the original source code, where a value was inadvertently left on the stack.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DETAILED DESCRIPTION OF SPECIFIC EMBODIMENT

Figure 1:
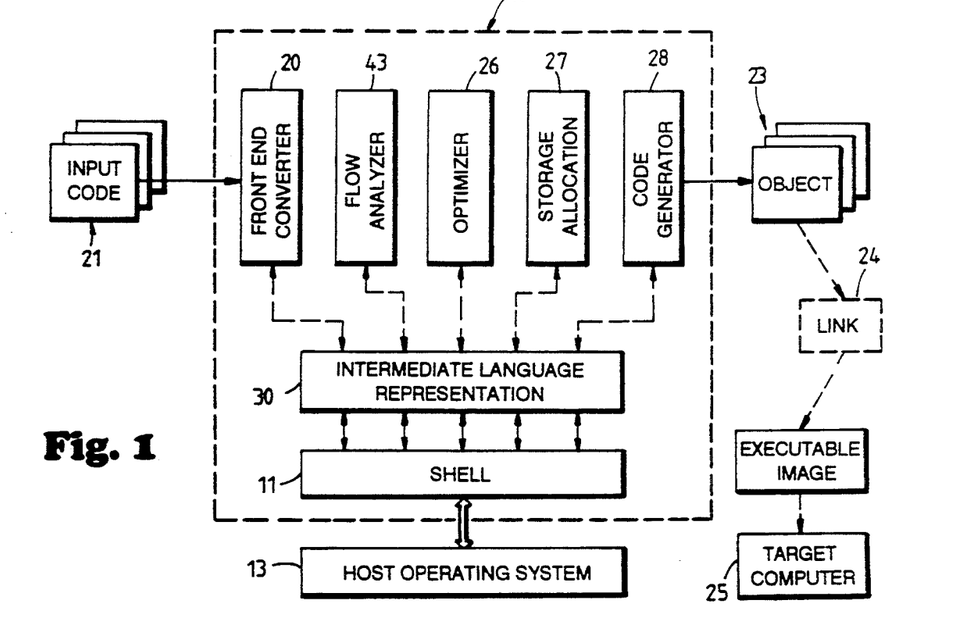
FIG. 1 is a diagram of the compiler or code translator functions, according to one embodiment of the invention.
Figure 2:
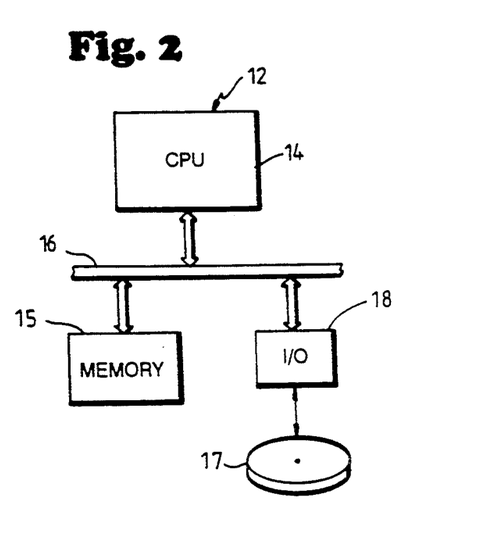
FIG. 2 is an electrical diagram of a host computer for executing the code translator program of FIG. 1.

Referring to FIG. 1, the code translator or interpreter 10 according to one embodiment of the invention resembles a compiler, and includes a portable operating system interface referred to as the shell 11, as well as a front end for converting the code and a back end, with optimizer and code generator, as is the usual practice. The shell 11 may be portable in that can be adapted to function with any of several operating systems such as VAX/VMS, Unix, etc., executing on the host computer 12. The VAX architecture is described by Levy and Eckhouse in "Computer Programming and Architecture: The VAX", 2nd Ed., Digital Press, 1989, which is incorporated herein by reference. The shell 11 operates under this host operating system 13 executing on a host computing system 12 of various architectures, as seen in FIG. 2, typically including a CPU 14 coupled to a main memory 15 by a system bus 16, and coupled to disk storage 17 by an I/O controller 18. The shell 11 and other elements are combined with a front end converter 20 to create a translator or "compiler" for converting code in a first language, e.g., VAX/VMS assembly language or object code, into object code for a different target architecture, e.g., an advanced 64-bit RISC architecture.

The front end converter 20 is the only component of the translator 10 which understands the input language being translated (compiled). This input language is that used in the file or files (module or modules) 21 which define the input of the translator. The front end converter 20 performs a number of functions. First, it calls the shell 11 to obtain command line information entered by the user (person operating the host computer 12 of FIG. 2). Second, the front end 20 calls the shell 11 to control the listing file, write diagnostic messages, and the like, as is usual for compilers. Third, the front end 20 does lexical, syntactic, and semantic analysis to translate the code of the input file 21 to an internal representation used for the interface between the front end and the back end. Fourth, the front end converter 20 invokes the back end (remaining parts of the translator) to generate object code modules 23 from the information in the internal representation. Not included in the translator 10 of FIG. 1 is a linker 24 which links the object code modules or images 23 (with runtime library, etc.) to form an executable image to run on the target machine 25.

The target machine 25 for which the back end 12 of the compiler creates code is a computer (generally of the form of FIG. 2) of some specific architecture, i.e., it has a register set of some specific number and data width, the logic executes a specific instruction set, specific addressing modes are available, etc. Examples are (1) a RISC type of architecture based upon the 32-bit RISC chip available from MIPS, Inc., as part number R2000 or R3000 and described by Lane in "MIPS R2000 RISC Architecture", Printice-Hall, 1987, and (2) an advanced RISC architecture with 64-bit registers as described in my copending application Ser. No. 547,589, filed Jun. 29, 1990. Various other architectures could be likewise accommodated, employing features of the invention.

In general, the front end converter 20 need not consider the architecture of the target machine 25 upon which the object code 23 will be executed, when the front end 20 is translating from source code 15 to the internal representation, since the internal representation is independent of the target machine 25 architecture.

The back end of the translator 10 functions like a compiler to translate the internal representation constructed by the front end 20 into target system object code modules 23. To this end, the back end performs the basic functions of optimization 26, storage and register allocation 27, and code generation and object file emission 28. The optimization function is performed on the code when it is in its internal representation.

When the user (that is, a user of the computer system of FIG. 2, where the computer system is executing the operating system 13) invokes the translator of FIG. 1, the shell 11 receives control. The shell 11 invokes the front end converter 20 to compile an input stream from input module 21 into an object file 23; the front end 20 invokes the back end to produce each object module within the object file 23.

Figure 3:
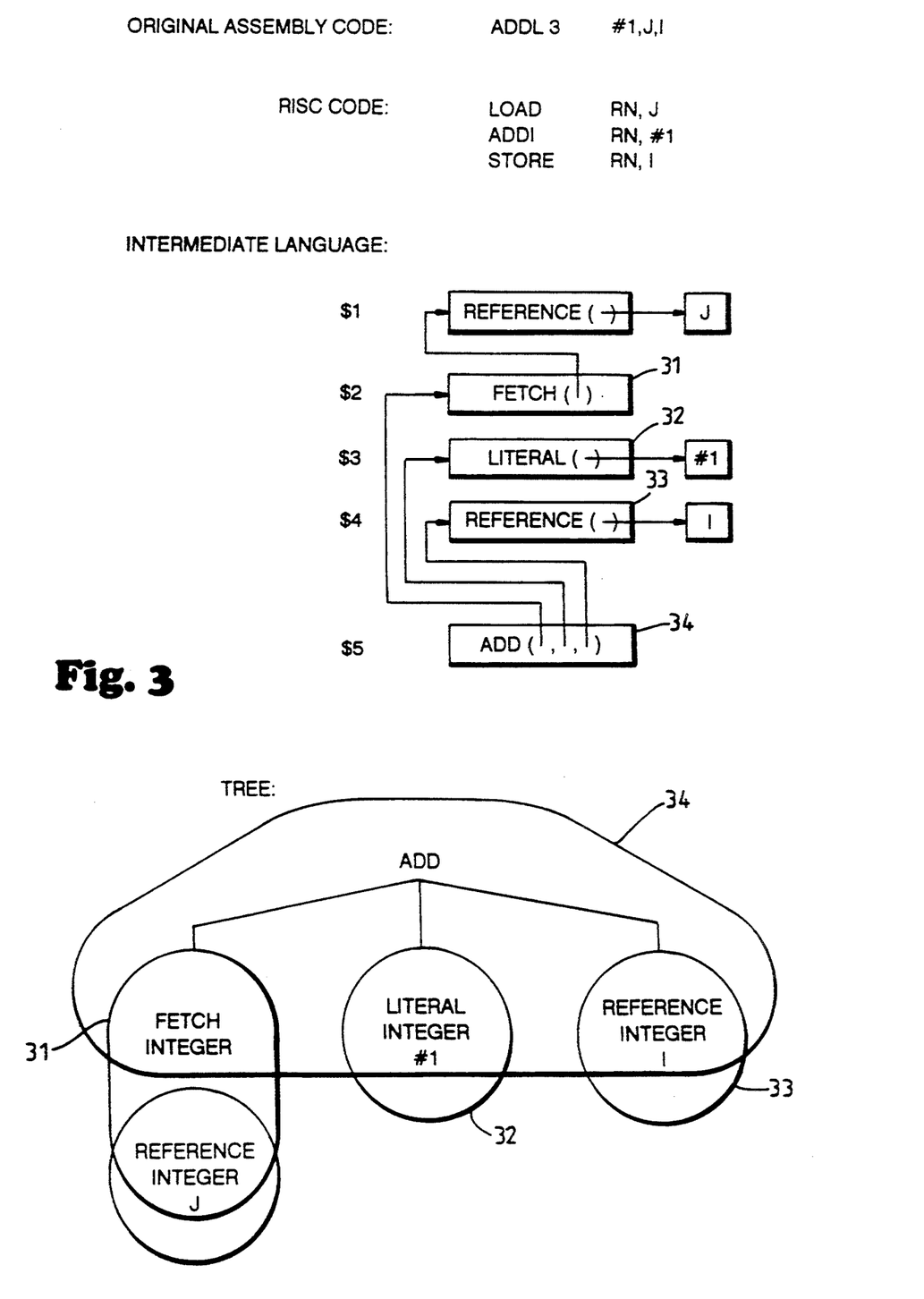
FIG. 3 is a diagram of an example of a line of code translated by the mechanism of FIGS. 1 and 2.

The front end 20 parses the input code 21 and generates an intermediate language version of the program expressed in the input code. This intermediate language version is stored in intermediate language tables 30 (including a symbol table), which are updated and rearranged by the stages of the compile functions as will be described. In one embodiment, this intermediate language may be VAX object code itself. Or, a more generic intermediate language may be employed, using an elemental structure of intermediate language known as a tuple, also referred to as an "n-tuple". A tuple is an expression which in computer programming language performs one operation. For example, referring to FIG. 3, an expression which might be written in a high level computer language as $$I=J+1$$

would appear in an assembly-language input file (or its equivalent in an object code input file 21 ) as

ADDL3 #1, J, I that is, add "1" to the contents of memory location J and place the result in memory location I. This code will be eventually translated into object code for a RISC machine which does only register-to-register arithmetic, and only register-to-memory or memory-to-register stores and loads, so it will appear as

| LOAD Rn, J | ; Load memory location J to Register N |
| Add Rn, #1 | ; Add constant 1 to Register N |
| STORE Rn, I | ; Store Register N to memory location I |

In intermediate language, however, the code is in a more elemental (and generic) form than even RISC assembly, and would include five tuples, these being numbered $1, $2, $3, $4 and $5 in FIG. 3. This way of expressing the code in IL includes a tuple $2 which is a fetch represented by an item 31, with the object of the fetch being a reference to symbol J, shown in tuple #1. The next tuple is a literal, item 32, making reference to the constant "1." The next tuple, item 33, is symbol reference to 'I', which will be the target of the addition operator. The last tuple is an Add, item 34, which makes reference to the source tuples $2 and $3, and to the destination tuple $4. The expression may also be expressed as a logic tree as seen in FIG. 3, where the tuples are identified by the same reference numerals.

Figure 4:
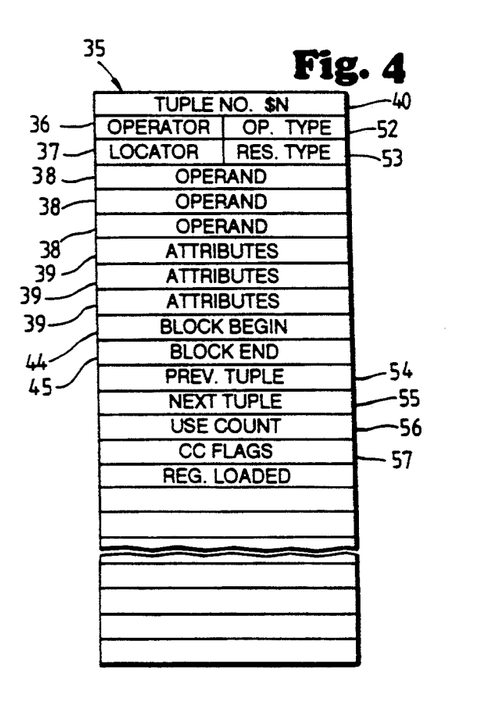
FIG. 4 is a diagram of the data structure of a tuple created in the code translator of FIG. 1.

A tuple, then, is the elemental expression of a computer program, and in the form used in this embodiment is a data structure 35 which contains at least the elements set forth in FIG. 4, including (1) an operator field 36, e.g., Fetch, Store, Add, etc., (2) a locator 37 for defining where in the input module 21 the input-code equivalent to the tuple is located, (3) operand pointers 38 to other tuples, to literal nodes or symbol nodes, such as the pointers to I and #1 tuples $4 and $3 in FIG. 3. A tuple also has attribute fields 39, which may include, for example, Label, Conditional Branch, Argument (for Calls), or SymRef (a symbol in the symbol table). The tuple has a number field 40, representing the order of this tuple in the block.

Figure 5:
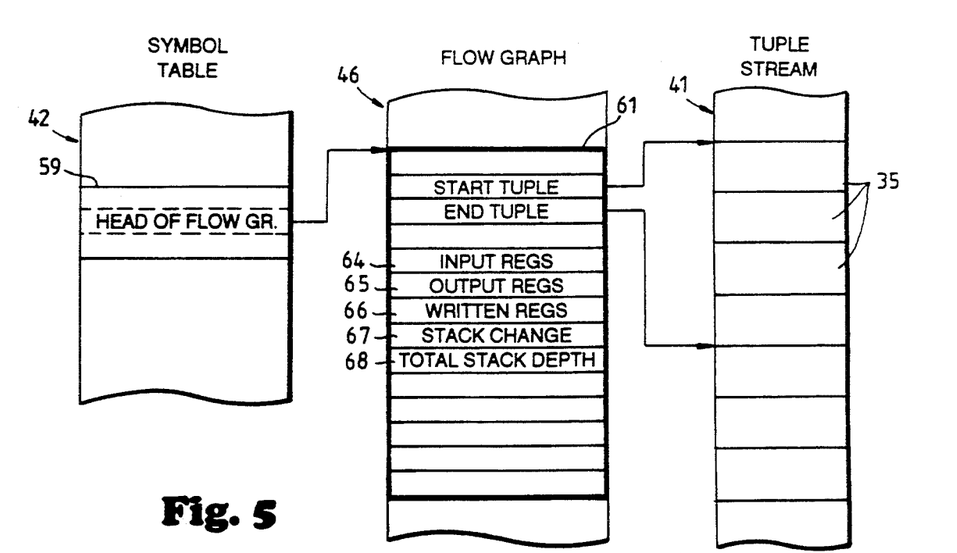
FIG. 5 is a more detailed diagram of the compiler front end in the translator of FIG. 1.

Referring to FIGS. 4 and 5, the front end converter 20 parses the input code 21 to identify tuples (or elements of object code) and to build an intermediate language tuple (or element) stream 41 and associated symbol table 42. The next step, performed by a flow analyzer 43, is to scan the tuple stream and identify basic blocks of code, called nodes. A block of code is defined to be a sequence of tuples with no entry or exit between the first and last tuple. Usually a block starts with a label or routine entry and ends with a branch to another label. A task of the converter 20 and flow analyzer 43 in the front end is to parse the input code 21 and identify the tuples and blocks (nodes), which of course requires the front end to be language specific. The tuple (or element) data structure 35 contains fields 44 and 45 that say whether or not this tuple is the beginning of a block, or the end of a block.

A flow graph 46 is generated by the flow analyzer 43 in the front end. The flow graph 46 consists of nodes, which are the basic blocks of the program, and edges, which represent the flow between nodes. The flow graph is built by processing the tuples 35 (intermediate language) created by the front end converter 20 of the compiler.

Figure 6:
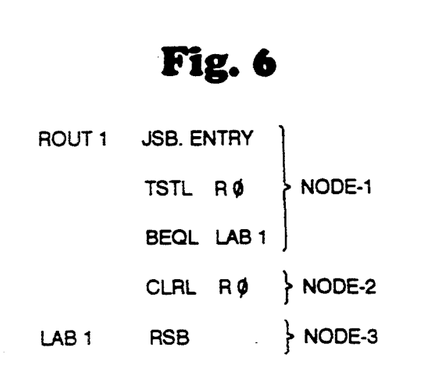
FIG. 6 is a listing of a small example of code illustrating the nodes or basic blocks of the code.

The process of building the flow graph 46 by the flow analyzer 43 includes walking the tuples sequentially for each program section. Referring to an example of code as seen in FIG. 6, the flow analyzer 43 adds tuples to the current flow node until one of the following is encountered, thus defining when the previous node ends and a new node begins:

(a) a label—branches to the label LAB1 will result in an edge being created to this node; hence, the label LAB1 is the first tuple in the new node Node-3, and it creates the edge ending Node-2;

(b) a routine entry point, in this case JSB_entry (the first tuple in Node-1, which is treated like a label for purposes of flow—however, the routine entry has an additional symbol table entry Rout1 identifying it as a routine;

(c) a branch instruction—the branch BEQL ends the preceding block, Node-1, and the next instruction CLRL begins a new block, Node-2;

(d) a return instruction, RSB, which is treated like a branch instruction which branches to a special routine exit node; thus RSB ends Node-3, which is only one tuple in length.

A branch instruction such as the BEQL of FIG. 6 also results in an edge being created, linking the node (Node-1) containing the branch to the node (Node-3) containing the label which is the branch destination (LAB1). If the branch is conditional, as here, an edge to the immediately following node (Node-2) will also be created, since flow may "fall through" to it. Indeed, an edge is a bidirectional link; the flow needs to be traceable in both forward and backward directions.

Accordingly, the intermediate language used in the code translator of FIG. 1 is expressed in the tuple stream 41 and a symbol table 42, along with the flow graph 46. The primitive concept is the tuple, and the intermediate language flow graph 46 is made up to link the tuples into nodes or blocks representing the operations to be executed, each tuple 35 having a data structure as in FIG. 4. These tuples 35 within nodes are tied together by pointers which represent various relations. The most important relations are the operator-operand relation (a pointer 38 from an operator to each of its operands) and the linear ordering represented as a tuple number field 40 on all the tuples in each basic block of the intermediate language flow graph 46; the order of the tuples within a node provides the execution order.

As mentioned in reference to FIG. 4, each tuple 35 has various fields, including the following:

(a) Generic operator 36—identifying the general operation performed by the tuple, e.g., ADD, FETCH, etc.

(b) Operator type 52—a data type which, normally, determines the specific operation performed by the tuple. The operator data type is primarily of interest only on data storage tuples. Instruction tuples are by definition self-contained, and will not be referenced in later instructions; hence, their data type is null.

(c) Result type 53—the data type of the value computed by this tuple. This is set only on data reference tuples, e.g., those that can be used as operands of other tuples.

(d) Operands 38—an array of pointers to the operands of this tuple. The number of operands is determined by the generic operator. Each operand pointer 38 points to another intermediate language tuple node, or, in some cases, to a symbol or literal node in the symbol table as in tuples $1, $3 and $4 of FIG. 3.

(e) Next/Prev tuple 54 and 55—pointers to the next and previous tuples in a doubly-linked list of tuples. The next tuple order is the implicit order of evaluation.

(f) Locator 37—the textual location in the input module 21, i.e., in the program source of the token or tokens which are compiled in this tuple. The locator is used in constructing error messages, source correlation tables, etc.

(g) Use count 56—this field is set by the analyzer to the number of references made in data reference tuples.

Some types of tuples have additional fields, known as attributes 39. Instances of attributes in the code translator in an embodiment of FIG. 1 include:

(a) Reference attributes, which point to nodes in the symbol table 42.

These are always present in LITREF, SYMREF, LABEL and entry point tuples, pointing to literal nodes, symbol nodes, label nodes, and entry nodes, respectively.

(b) Instruction attributes, which are VAX instruction type constants. These are present in INSTR (instruction) and CONDBR (conditional branch) tuples, and further specify the instruction or branch operation.

(c) Register attributes, which are simply register numbers specified in REGREF (register reference) tuples.

Other additional private fields may be introduced into the tuple structures by the analyzer or code generator; these include:

(a) Condition code flags in field 57 on INSTR and CONDBR tuples. These are used by the flow analyzer 43 to indicate that the code generator 28 must instantiate one or more of the VAX condition code values for an instruction.

(b) A register-loaded field 58 for SYMREF MEMREF IDXREF and FETCH tuples, used within the code generator 28 to allow re-use of addresses or values already loaded to registers.

The flow graph 46 is a major component of the intermediate representation, and is constructed and used by the flow analyzer 43, then later traversed by the optimizer 26, the storage allocator 27 and code generator 28. The tuples 35 for a particular routine or program (or input module 21) are in the tuple stream 41, linked by pointers 38, 54, 55, and having blocks or nodes defined by fields 48, 49. The flow graph 46 identifies the nodes or blocks by pointers to the beginning and ending tuples of the tuple stream. Since routines, labels, etc., will have entries in the symbol table 42, the symbol table is the reference point for tracing the program, i.e., finding the blocks and their ordering. The flow graph of the code of FIG. 6 may be illustrated as in FIG. 7, where it is seen that there are two paths from Node-1, that is, to Node-3 via Node-2 if the conditional branch fails, or directly to Node-3 if the branch is taken.

Figure 7:
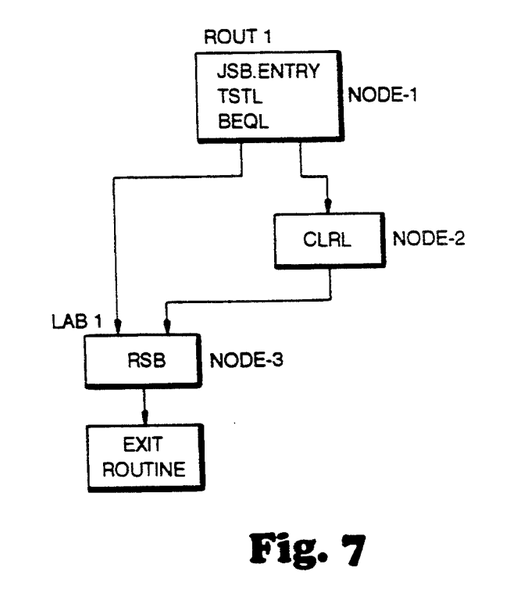
FIG. 7 is a flow graph of the program expressed in the code of FIG. 6.

A routine such as that of FIG. 7 has an entry or node 59 in the symbol table 42 as seen in FIG. 5 which includes a pointer 60 to the flow node 61 in the flow graph 46, and this node 61 includes pointers 62 and 63 to the beginning and ending tuples 35 of the tuples stream 41. Each flow node 61 also has a number of other fields, e.g., for stack usage, register usage and condition code usage.

Once a pass over the tuples by the flow analyzer 43 has created the flow graph 46, the flow for each routine can be walked by the flow analyzer 43 for computing the stack reference information of interest for certain features of the invention.

A pass is made by the flow analyzer 43 through each routine in the module 21 as represented in intermediate language as illustrated in FIG. 5. The routine node 59 in the symbol table 42 points to the flow node 61 for the entry point of the routine. The flow graph 46 is recursively traversed starting at this node; first, the tuples 35 of a node as referenced in the tuple stream 41 will be walked looking for constructs described below. Then, the graph traversal routine is called for each of its successors (nodes 61 linked by a forward edge) which has not already been visited. The recursive walk ends at nodes which have only routine exit nodes as successors.

The tuples 35 of each node 61 are scanned looking for stack references and modifications—modifications to the stack may be the result of explicit instructions, such as PUSH/POP, ADD, etc., or due to the VAX addressing mode used, such as (SP)+, which implicitly pops the stack pointer. At the end of the tuples 35 for the current node 61, the net change to SP due to the tuples in this node is stored in a field 67 in the flow node. The total depth thus far in the routine flow is also computed. This is passed to the node processing routine with each recursive call, and stored in the node in a field 68.

Thus, at every point during this walk, the compiler has available the total stack change since routine entry. This allows it to detect code which:

(i) reads the return address from the stack
(ii) modifies the return address on the stack
(iii) removes the return address from the stack
(iv) issues a jump-subroutine JSB procedure call through the return address to implement a co-routine linkage
(v) makes an up-level stack reference
(vi) makes an unaligned stack reference
(vi) modifies SP such that it is no longer longword aligned These are all flagged with specific errors. The first five are machine architecture and calling standard-specific coding practices which must be changed manually in the source code. The latter two are flagged due to the performance penalties of unaligned stack references.

As mentioned above, successor nodes 61 in the flow graph 46 which are already marked "visited" in a field 69 are not re-visited; however, the flow analyzer checks the initial stack depth stored with the node in field 68. If that depth is different than the total depth at the end of the current node 61, the compiler reports a message indicating that this point in the code can be reached with different stack depths. This may indicate a source code error, where the stack was not correctly adjusted by the user on some code path. A simplified example of this might be:

```
        pushl   r1
        beql    lab1      ; instructions which do not modify SP
        .
        .
        .
        pushl   r2
                          ; instructions which do not modify SP
        .
        .
        .
lab1:   popl    r2        ; This point may be reached with 1
                          ; or new longwords on the stack.
        rsb               ; In this case, it is probably and
                          ; error, because the RSB instruction
                          ; expects the return address
                          ; to be on top of the stack.
```

Referring to FIGS. 8–11, logic flow charts are illustrated which represent a view of the flow analysis involved in methods having features of the invention. The calling structure is summarized in the following paragraphs.

Figure 8:
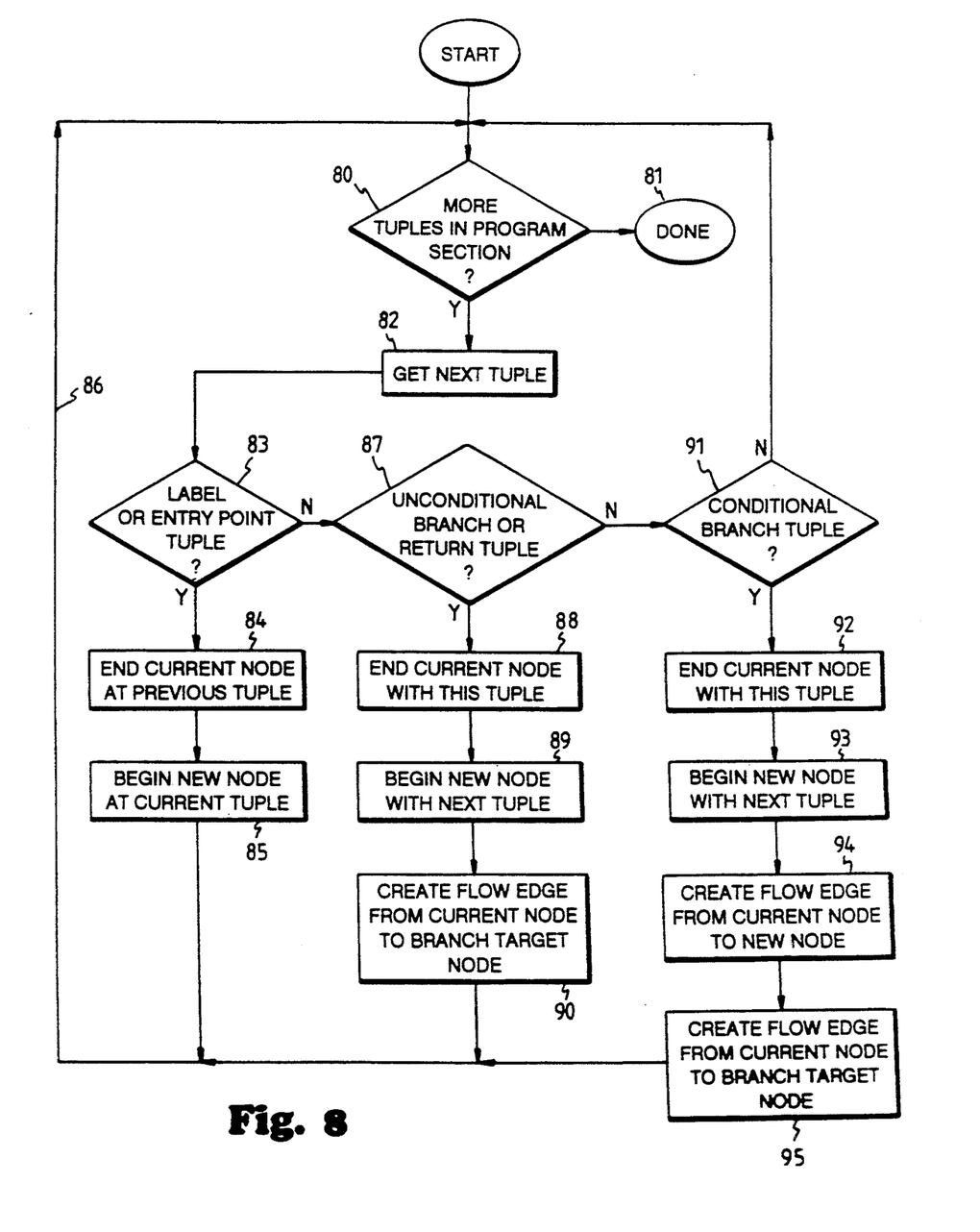
FIG. 8 is a logic flow chart of a procedure referred to as Build_Flow_Graph, used in the method of the invention, according to one embodiment.

The procedure referred to as Build_Flow_Graph, illustrated in FIG. 8, is called once per compilation, and functions to build all of the routine flow graphs for the entire module being compiled.

Figure 9:
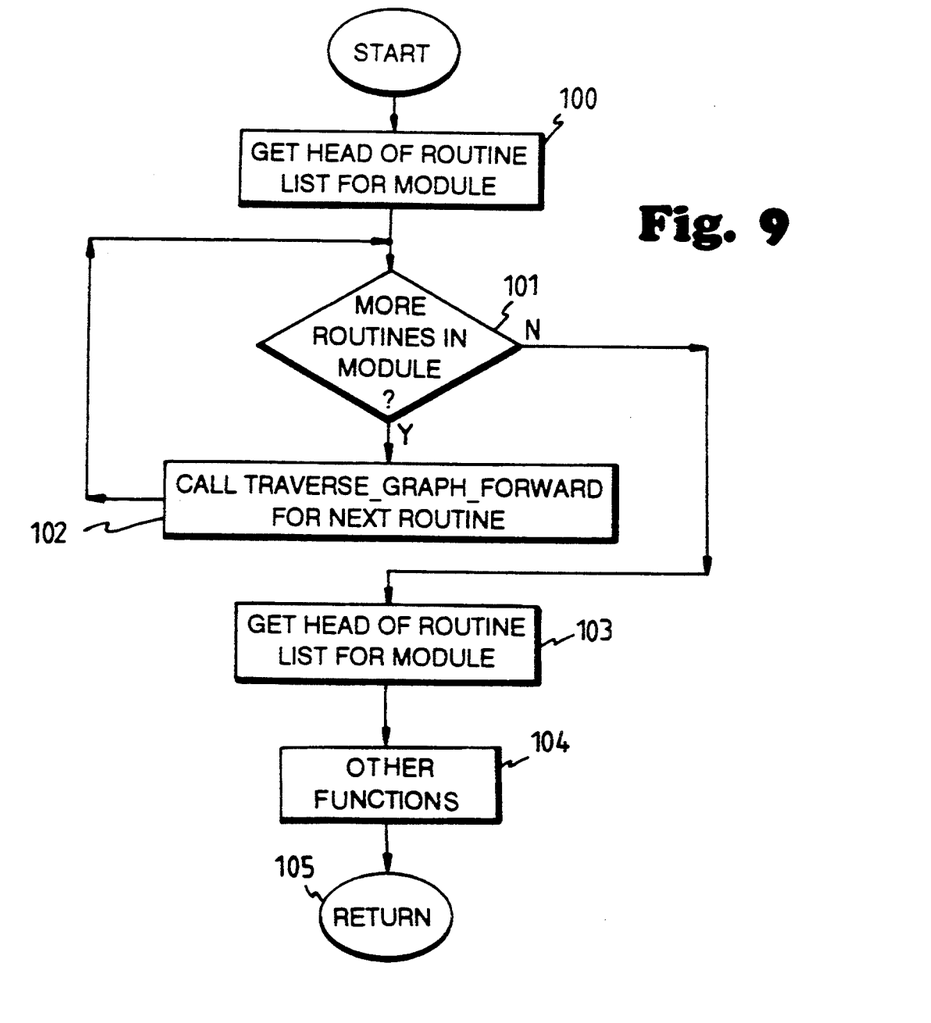
FIG. 9 is a logic flow chart of a procedure referred to as Analyze_Flow_Graph, used in the method of the invention, according to one embodiment.

The procedure referred to as Analyze_Flow_Graph, illustrated in FIG. 9, is called after Build_Flow_Graph, also once per compilation, and functions to perform the analysis on all the routines in the module.

Figure 10:
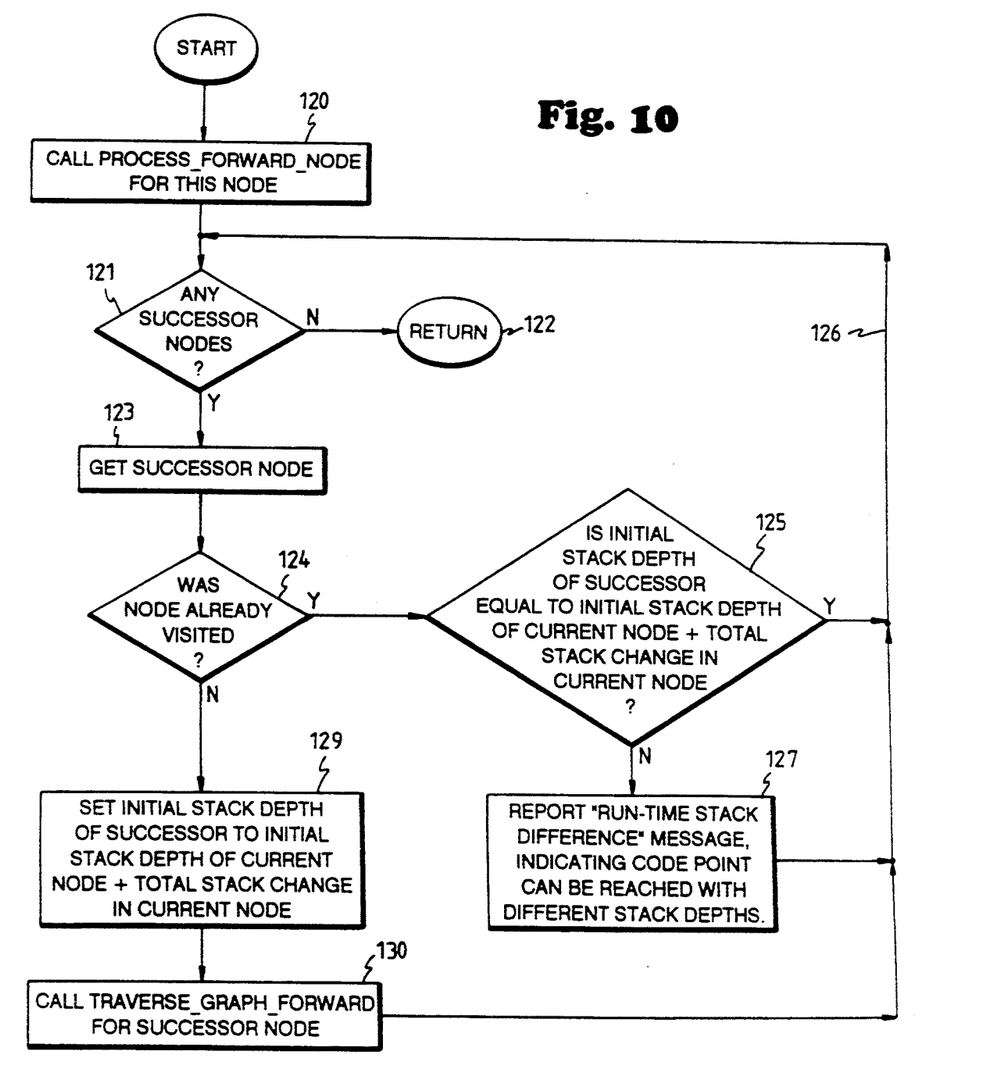
FIG. 10 is a logic flow chart of a procedure referred to as Traverse_Graph_Forward, used in the method of the invention, according to one embodiment.
Figure 11A:
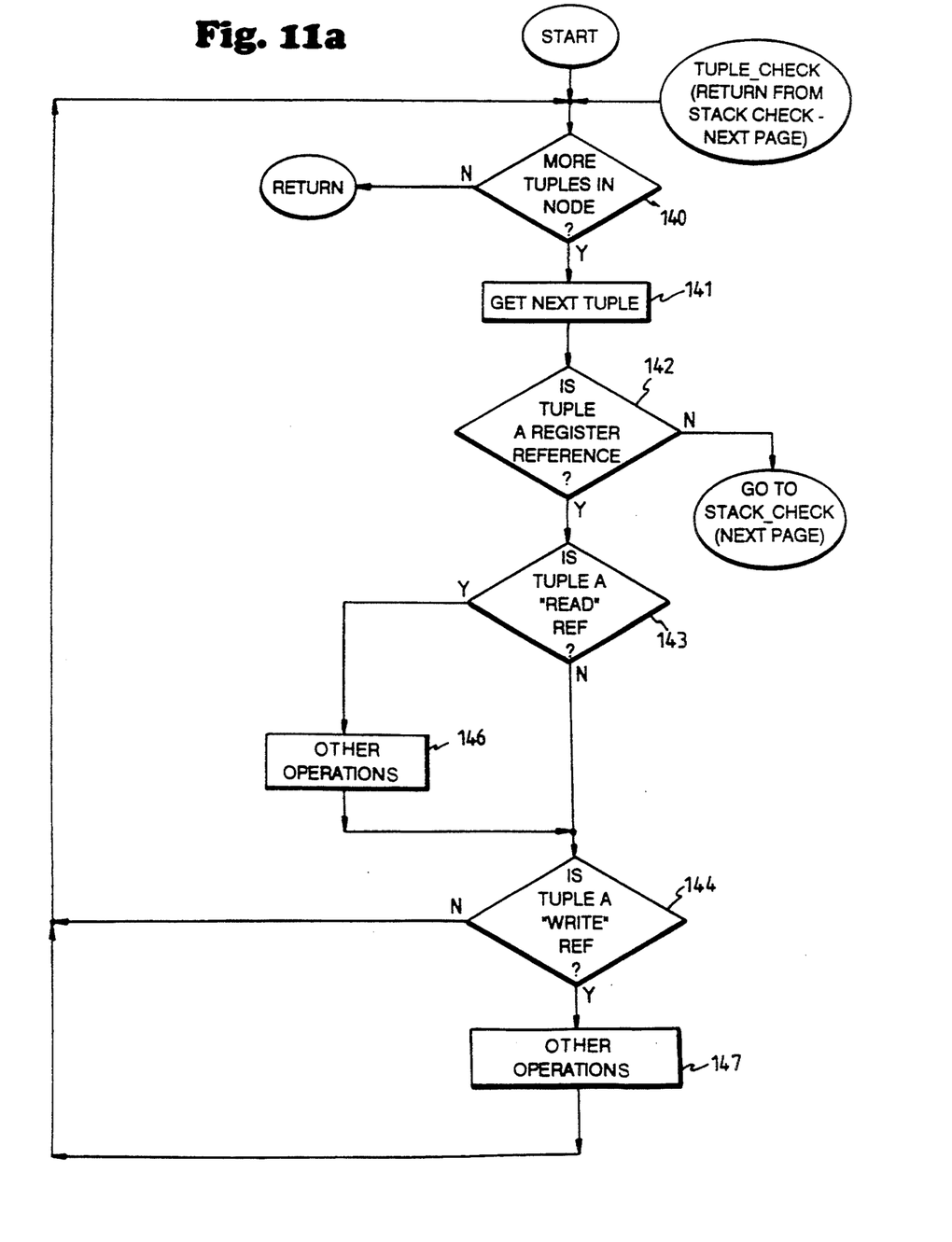
FIGS. 11a and 11b are a logic flow chart of a procedure referred to as Process_Forward_Node, used in the method of the invention, according to one embodiment.

The procedure referred to as Traverse_Graph_Forward, illustrated in FIG. 10, is called by Analyze_Flow_Graph, and itself calls Process_Forward_Node of FIG. 11a, to process the tuples of the current node in forward order, and then calls itself recursively for each successor of the current node which has not already been visited.

Figure 11B:
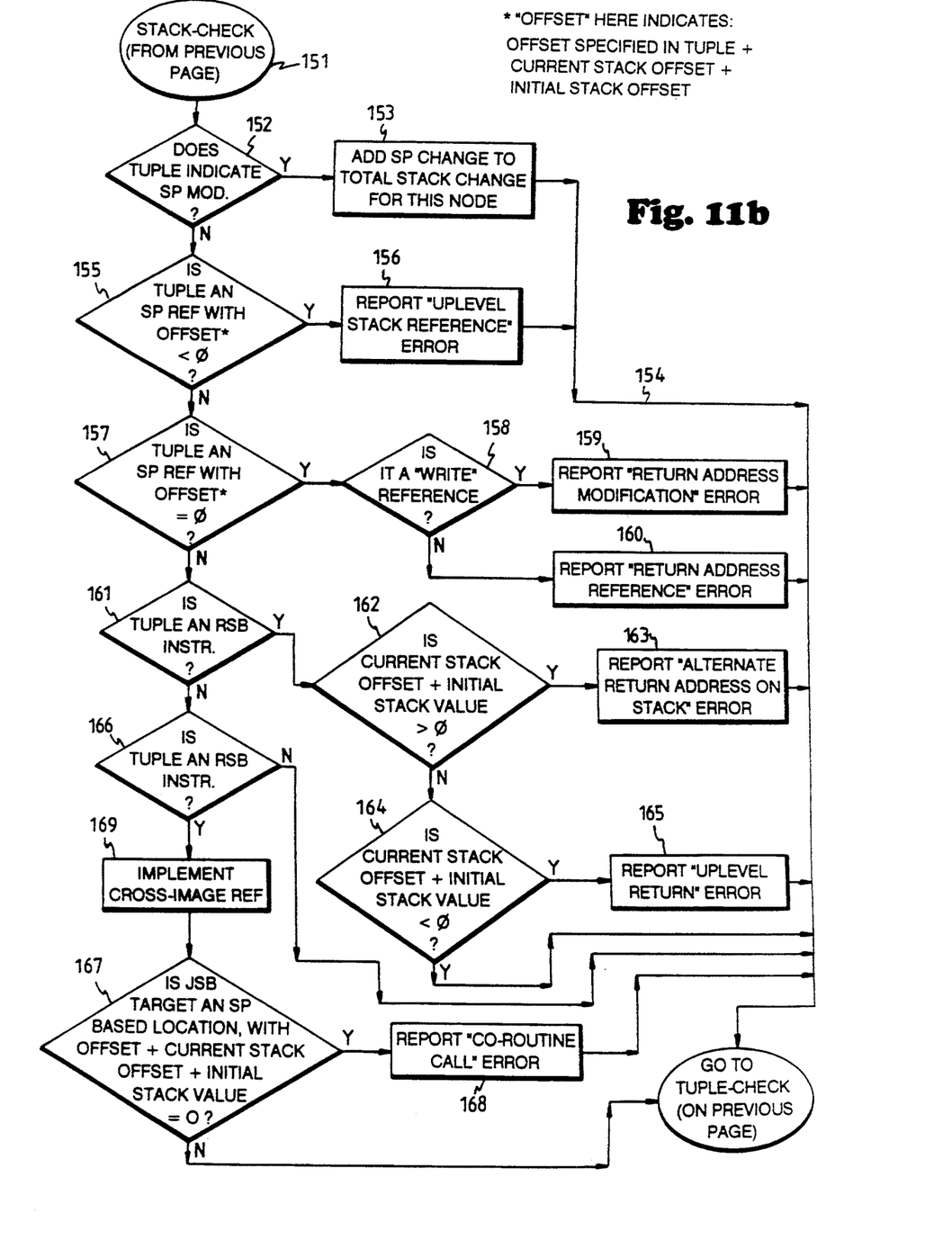

The procedure referred to as Process_Forward_Node, illustrated in FIGS. 11a–11b, is self-contained, and functions to simply walk the tuples in forward order.

Referring now to FIG. 8, when Build_Flow_Graph is invoked, the selected program section, i.e., tuple stream 41, is examined, and the decision point 80 examines to see if there are more tuples in this section. If not, the procedure is exited at point 81; if so, then the next tuple is fetched as indicated by the item 82. This next tuble is examined to see if it is a label or entry point tuple, at decision point 83. If so, then the current node is ended at the previous tuple, at item 84, and this tuple is noted as starting a new node, at item 85, after which control returns to the decision point 80 via path 86. If, at decision point 83, the tuple is found not to be a label or entry point, it is examined at point 87 to see if it is an unconditional branch or return tuple. If so, the current node is ended with this tuple, as indicated by item 88, and the next tuple is noted as starting a new node, at item 89. A flow edge is created from the current node—to the branch target node—as indicated by the item 90, after which control returns to the decision point 80 via path 86. If, at decision point 87, the tuple is found to be neither an unconditional branch or a return tuple, then it is examined to see if it is a conditional branch tuple, indicated by decision point 91. If so, again the current node is ended with this tuple, as indicated by item 92, and the next tuple is noted as starting a new node, at item 93. A flow edge is created from the current node—to the new node—as indicated by the item 94. Then, a flow edge is created from the current node—to the branch target node—as indicated by the item 95, after which control returns to the decision point 80 via path 86. If, at decision point 91, a conditional branch was not found, then control returns to point 80.

Referring to FIG. 9, the procedure Analyze_Flow_Graph begins by getting the head of the routine list for the module being processed, as indicated by the item 100. Then, the list is checked to see if there are more routines in the module, at decision point 101. If so, then the procedure Traverse_Graph_Forward is called for the next routine, as indicated by the item 102; the Traverse_Graph_Forward is discussed below with reference to FIG. 10. If not, then again the head of the routine list is fetched, at item 103, and other functions not pertinent here are performed before return at point 104.

Referring to FIG. 10, the Traverse_Graph_Forward routine, called from item 102 of FIG. 9, begins at item 120 by calling the Process_Forward_Node procedure of FIG. 11a, for this node. After return from the Process_Forward_Node call, for each node, a check is made at decision point 121 to see if there are any successor nodes. If not, control returns to item 102 of FIG. 9 via point 122. If so, information about the successor node is fetched at item 123, and checked to see if it has already been visited at decision point 124. If already visited, then at decision point 125 the initial stack depth of successor node (isd$_s$) is compared to a value of the final stack depth of the current node (isd$_c$); if these are equal then control returns to the item 121 via path 126, but if not the item 127 reports a "run-time stack difference" message, indicating that this code point can be reached with different stack depths. Before entering item 127, however, it may be preferred to first check as indicated by decision point 128 to see if the stack pointer is actually going to be used again; if so, the box 127 is entered, but if not then control returns to point 121 via path 126—in this manner, a number of unnecessary error messages are avoided. If at point 124 the successor node is found not previously visited, the item 129 is entered where the initial stack depth of the successor node (isd$_s$) is set to the initial stack depth of the current node (isd$_c$) plus the total stack change in the current node. Then, the Traverse_Graph_Forward procedure is called for the successor node, at item 130. Return from Traverse_Graph_Forward passes control back to the point 121, checking for any successor nodes.

Referring to FIGS. 11a and 11b, the Process_Forward_Node procedure is illustrated in flow chart form. First, at point 140 of FIG. 11a, a check is made to see if there are more tuples in the node. If not, control is returned to the calling procedure, item 120 of FIG. 10. If so, the next tuple is fetched at item 141, and the next tuple is checked at point 142 to see if it is a register reference. If so, then the tuple is checked at points 143 and 144 to see if it is a read or write reference. If neither a read reference nor a write reference, control returns to point 140 via path 145. If the tuple is a read or write reference, operations as indicated by boxes 146 and 147, not related to this embodiment, are performed, before returning to point 140 via path 145.

If, at point 142 of FIG. 11a, it is found that the tuple is not a register reference, then flow goes to the stack check beginning point 151 of FIG. 11b. The tuple is checked at point 152 to see if it indicates a stack pointer SP modification, and if so the stack pointer SP change is added to the total stack change for this node, at item 153, after which control is returned to the point 140 via path 154. If the tuple does not indicate a SP modification, then it is checked at point 155 to see if it is a stack pointer reference with offset less than $\phi$, where offset here indicates (offset specified in tuple plus the total offset at this point in the routine flow). If so, an "uplevel stack reference" error is reported at item 156, then return via path 154. If not, then the tuple is checked at point 157 to see if it is a stack pointer reference with offset equal to $\phi$; if so the tuple is checked at point 158 to see if it is a "write" reference, and if a write reference a "return address modification" error is reported at item 159, but if not a write reference then a "return address reference" error is reported at item 160, before returning via path 154 in either case. A negative result from the check at point 157 results in control passing to the check at point 161 where the tuple is examined to see if it is a return-subroutine RSB instruction. If an RSB instruction, a check is made at point 162 to see if the current stack offset plus the initial stack value is greater than $\phi$, and if so an "alternate return address on stack" error is reported at item 163, but if not then a check is made at point 164 to see if the current stack offset plus the initial stack value is less than $\phi$, in which case an "uplevel return" error is reported at point 165. If the tuple is not an RSB instruction, then it is checked at point 166 to see if it is a jump-subroutine JSB instruction, in which case it is checked at point 167 to see if the JSB target is a stack pointer based location, with offset plus current stack offset plus initial stack value equal to $\phi$, in which case a co-routine call" error is reported at item 168. If none of the tests at points 152, 155, 157, 161, or 166 is positive, the stack is not involved, and control passes back to the point 140 of FIG. 11a via path 154.

The concepts of the invention are also useful in a translator which creates more than one code image 23, and calls are made from one image to another. A mechanism is available for resolving cross-image references in a code translator. It is useful to track stack depth across different images so if one image makes a procedure call to another image that is translated at a different time (which image may also make calls to the image currently being translated), the types of coding errors discussed herein can be identified. To this end, in the flow chart of FIG. 11b, when a JSB instruction is found at decision point 166, the box 169 indicates the target subroutine is checked to see if a net change in the stack pointer is implemented in that subroutine, and if so, the change is recorded before continuing to trace this calling routine. Further, if multiple images are involved, the inside of the JSB target is likewise analyzed.

Although the invention has been described above in connection with a CISC-to-RISC code translator, the invention is also very useful for translating CISC code of one programming language to CISC code of another programming language, for example, to transport a program from one kind of digital computer to another kind of digital computer, or to transport a program from one kind of operating system to another kind of operating system. Moreover, the analysis and error checking features of the invention can be used for testing and debugging a program without translating it.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of processing computer code in a compiler or code translator, comprising the steps of:

generating a flow graph representing said code, said flow graph being composed of a plurality of blocks, and said blocks being composed of a plurality of elements, each of said elements representing a single action in said code, each of said blocks representing a sequence of one or more of said elements beginning with an entry and ending in a branch or return, and each said block having no intermediate entry;

tracing through each said block of said flow graph to detect any said elements which have an effect of modifying a stack pointer for a stack, and recording for each said block a net change in said stack pointer by said block and a total depth of said stack from a beginning of said tracing; and recording for each said block that said block has been visited in said tracing, and, in tracing through each said block of said flow graph, checking each said block before entering to see if said block has been visited, and, if so, going to another path rather than visiting said block again.

2. A method according to claim 1 including the step of, upon completing said tracing step, reporting a difference in the recorded total depth of said stack for a current block and a successor block which has already been visited.

3. A method according to claim 1 wherein each of said elements is an instruction in object code.

4. A method according to claim 1 wherein said code includes a plurality of callable routines, and including the step of recording the stack depth while tracing each said callable routine.

5. A method according to claim 4 including the step of generating a plurality of code images from input computer code, and wherein at least two of said code images contain calls from one to the other.

6. A method according to claim 5 including the step of recording a stack depth for callable routines across said at least two code images.

7. Apparatus for processing computer code in a compiler or code translator, comprising:

means for generating a flow graph representing said code, said flow graph being composed of a plurality of blocks, and said blocks being composed of a plurality of elements, each of said elements representing a single expression in said code, each of said blocks representing a sequence of one or more said elements beginning with an entry and ending in a branch or return, each of said blocks having no intermediate exit or entry;

means for tracing through each said block of said flow graph to detect any said elements which have an effect of modifying said stack pointer, and means for recording for each said block a net change in a stack pointer of a stack by each said block and a total depth of said stack from a beginning of said tracing; and means for recording for each said block that said block has been visited in said tracing, and, in tracing through each said block of said flow graph, checking said block before entering to see if said block has been visited, and, if so, going to another path rather than visiting said block again.

8. Apparatus according to claim 7 including means for, upon completing a tracing of a block, reporting a difference in the recorded total depth of said stack for a current block and a successor block which has already been visited.

9. A method of translating input code written for a first machine architecture to produce object code for a different machine architecture, comprising the steps of:
generating a flow graph representing said input code, said flow graph being composed of a plurality of blocks, and said blocks being composed of a plurality of elements, each said element representing a single expression in said input code;
tracing through each said block of said flow graph to detect any said elements which have an effect of modifying a stack pointer of a stack, and recording for each block a net change in said stack pointer by said elements of said block which have an effect of modifying said stack pointer and a total depth of said stack from a beginning of said tracing; and
recording for each said block that said block has been visited in said tracing, and, in tracing through each said block of said flow graph, checking said block before entering to see if said block has been visited, and, if so, going to another path rather than visiting said block again.

10. A method according to claim 9 wherein said different machine architecture is a RISC architecture.

11. A method according to claim 9 wherein each said block represents a sequence of one or more elements beginning with an entry and ending in a branch or return, and further has no immediate entry.

12. A method according to claim 9 including the step of, upon completing said tracing step, reporting a difference in the recorded total depth of said stack for a current block and a successor block which has already been visited.

13. A method according to claim 12 wherein said code includes a plurality of callable routines.

14. A method of processing computer code in a compiler or code translator, comprising the steps of:
generating a flow graph representing said code, said flow graph being composed of a plurality of blocks, and said blocks being composed of a plurality of elements, each said element representing a single expression in said code;
tracing through each said block of said flow graph to identify any said elements which reference a stack or have an effect of modifying a stack pointer, and recording for each said block a net change in said stack pointer by said block and a total depth of said stack from a beginning of said tracing, and
upon completing said step of tracing for all of said blocks, reporting to a user an identity of said blocks having potentially improper stack references.

15. A method according to claim 14 wherein said input code is written for a first machine architecture, and said method produces object code for a different machine architecture.

16. A method according to claim 14 wherein each said block represents a sequence of one or more elements beginning with an entry and ending in a branch or return, and further has no intermediate entry.

17. A method according to claim 14 wherein each of said elements is an instruction in object code.

18. A method according to claim 14 wherein said code includes a plurality of callable routines.

19. A method according to claim 18 including the step of recording for each said block that said block has been visited in said tracing.

20. A method according to claim 19 including the step of, in tracing through each block of said flow graph, checking each said block before entering to see if said block has been visited, and, if so, going to another path rather than visiting said block again.

21. A method according to claim 20 including the step of, upon completing said steps of tracing, reporting a difference in the recorded total depth of the stack for a current block and the recorded total depth for a successor block which has already been visited.

22. A method according to claim 14 wherein said code includes a plurality of callable routines, and including the step of recording the stack depth while tracing each said callable routine.

23. A method according to claim 22 including the step of generating a plurality of code images from input computer code, and wherein at least two of said code images contain calls from one to the other.

24. A method according to claim 23 including the step of recording a stack depth for callable routines across said at least two code images.

* * * * *